(12) United States Patent
Duggan et al.

(10) Patent No.: US 12,333,019 B2
(45) Date of Patent: Jun. 17, 2025

(54) RISK ASSESSMENT BASED ON SOFTWARE BILL OF MATERIALS

(71) Applicant: BlackBerry Limited, Waterloo (CA)

(72) Inventors: Neil David Jonathan Duggan, Basingstoke (GB); Vincenzo Kazimierz Marcovecchio, Toronto (CA); Adam John Boulton, Wirral (GB)

(73) Assignee: BlackBerry Limited, Waterloo (CA)

( * ) Notice: Subject to any disclaimer, the term of this patent is extended or adjusted under 35 U.S.C. 154(b) by 359 days.

(21) Appl. No.: 17/736,433

(22) Filed: May 4, 2022

(65) Prior Publication Data

US 2023/0359744 A1 Nov. 9, 2023

(51) Int. Cl.
*G06F 21/57* (2013.01)
*G06F 8/65* (2018.01)
*G06F 21/62* (2013.01)

(52) U.S. Cl.
CPC .............. *G06F 21/577* (2013.01); *G06F 8/65* (2013.01); *G06F 21/6227* (2013.01)

(58) Field of Classification Search
CPC ....... G06F 21/577; G06F 8/65; G06F 21/6227
USPC .......................................................... 726/25
See application file for complete search history.

(56) References Cited

U.S. PATENT DOCUMENTS

| | | | |
|---|---|---|---|
| 2015/0268948 A1* | 9/2015 | Plate | G06F 21/577 717/123 |
| 2018/0239898 A1 | 8/2018 | Haerterich et al. | |
| 2019/0050576 A1 | 2/2019 | Boulton | |
| 2020/0201620 A1* | 6/2020 | Beard | G06F 8/61 |
| 2021/0029151 A1* | 1/2021 | Brooks | H04L 9/3218 |
| 2022/0083652 A1* | 3/2022 | Ransford | G06F 21/552 |
| 2022/0337611 A1 | 10/2022 | Brazao et al. | |
| 2022/0343762 A1* | 10/2022 | Alvarez | B60W 50/14 |

FOREIGN PATENT DOCUMENTS

| | | |
|---|---|---|
| EP | 1376343 | 1/2004 |
| EP | 3716113 | 9/2020 |

OTHER PUBLICATIONS

Extended European Search Report in European Appln. No. 23164627.4, mailed on Sep. 20, 2023, 6 pages.
U.S. Appl. No. 17/736,428, filed May 4, 2022, Duggan et al.
Grammatech.com [online], "CodeSentry—Software Supply Chain Security Platform" Oct. 2020, [retrieved on Jul. 5, 2022], retrieved from : URL <https://www.grammatech.com/codesentry-sca>, 8 pages.
ISO/SAE "Road Vehicles—Cybersecurity Engineering" Final Draft, International Standard, ISO/SAE FDIS 21434, May 2021, 92 pages.

(Continued)

*Primary Examiner* — Jacob Lipman
(74) *Attorney, Agent, or Firm* — Fish & Richardson P.C.

(57) ABSTRACT

Systems, methods, and software can be used to identify security risks in software code based on software bill of materials (SBOM). In some aspects, a method includes: obtaining, by a server, software code and a SBOM corresponding to the software code; identifying, by the server and based on the SBOM, a library used by the software code; and generating, by the server, a risk assessment based on at least one metric corresponding to the library, where the at least one metric is associated with one or more maintainers of the library.

18 Claims, 3 Drawing Sheets

(56) References Cited

OTHER PUBLICATIONS

The United States Department of Commerce, "The Minimum Elements For a Software Bill of Materials (SBOM)" Pursuant to Executive Order 14028 on Improving the Nation's Cybersecurity, Jul. 12, 2021, 28 pages.

Whitehouse.gov [online], "Executive Order on Improving the Nation's Cybersecurity" May 12, 2021 [retrieved on Jul. 5, 2022], retrieved from : URL <https://www.whitehouse.gov/briefing-room/presidential-actions/2021/05/12/executive-order-on-improving-the-nations-cybersecurity/>, 19 pages.

Wikipedia.org [online], "Evaluation Assurance Level" created on Sep. 2004, [retrieved on Jul. 5, 2022], retrieved from : URL <https://en.wikipedia.org/wiki/Evaluation_Assurance_Level>, 6 pages.

Non-Final Office Action in U.S. Appl. No. 17/736,428, mailed on Jun. 6, 2024, 14 pages.

\* cited by examiner

RISK ASSESSMENT BASED ON SOFTWARE BILL OF MATERIALS

TECHNICAL FIELD

The present disclosure relates to identifying security risks in software code based on software bill of materials.

BACKGROUND

In some cases, software services can be provided by software code. The software code can be created by assembling software components, including open source and/or commercial software components. A software bill of materials (SBOM) can be used to describe the software components of the software code. For example, the SBOM can include a list of the software components used to create the software code and metadata associated with each software component.

DESCRIPTION OF DRAWINGS

Like reference numbers and designations in the various drawings indicate like elements.

DETAILED DESCRIPTION

In some implementations, software code can include security risks resulting from software supply chain attacks. In software supply chain attacks, the producer of the software code may not have been hacked and may appear non-vulnerable, but the tools or libraries used by the producer to produce the software code may have been compromised. Examples of software supply chain attacks include SolarWinds, watering hole attacks, software backdoors, etc. In some cases, a software bill of materials (SBOM) can be created to document the components and vulnerabilities of software code. The SBOM can be used to detect software supply chain attacks. For example, the SBOM can include a list of libraries used by the software code and a respective vulnerability level corresponding to each library. A server can process a SBOM and flag vulnerability issues of the software components. However, a more comprehensive security analysis of the software components, in particular open software libraries, is possible by leveraging information beyond the vulnerability levels documented in the SBOM.

Figure 1:
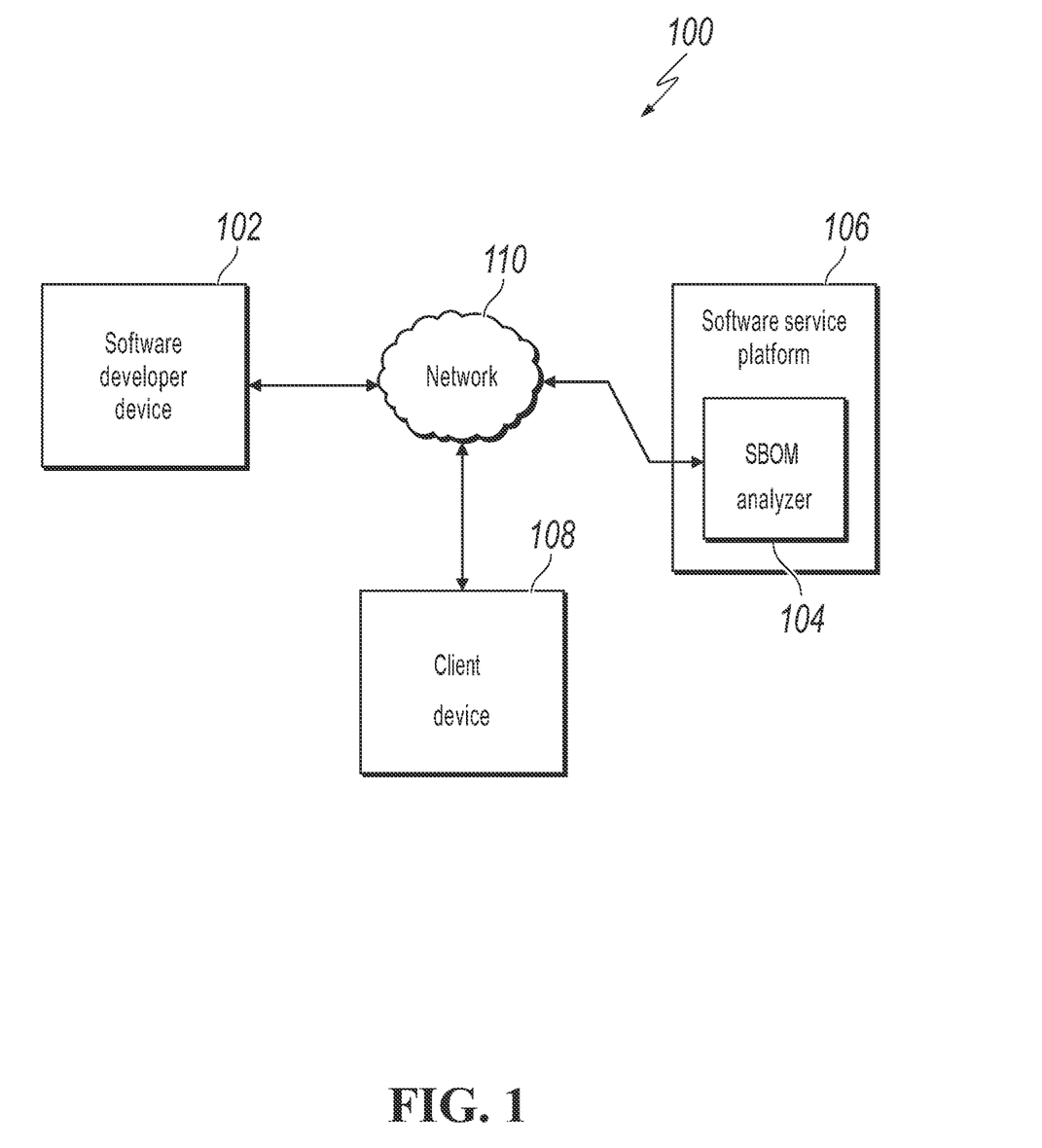
FIG. 1 is a schematic diagram showing an example communication system that identifies security risks in software code based on software bill of materials (SBOM), according to an implementation.
Figure 2:
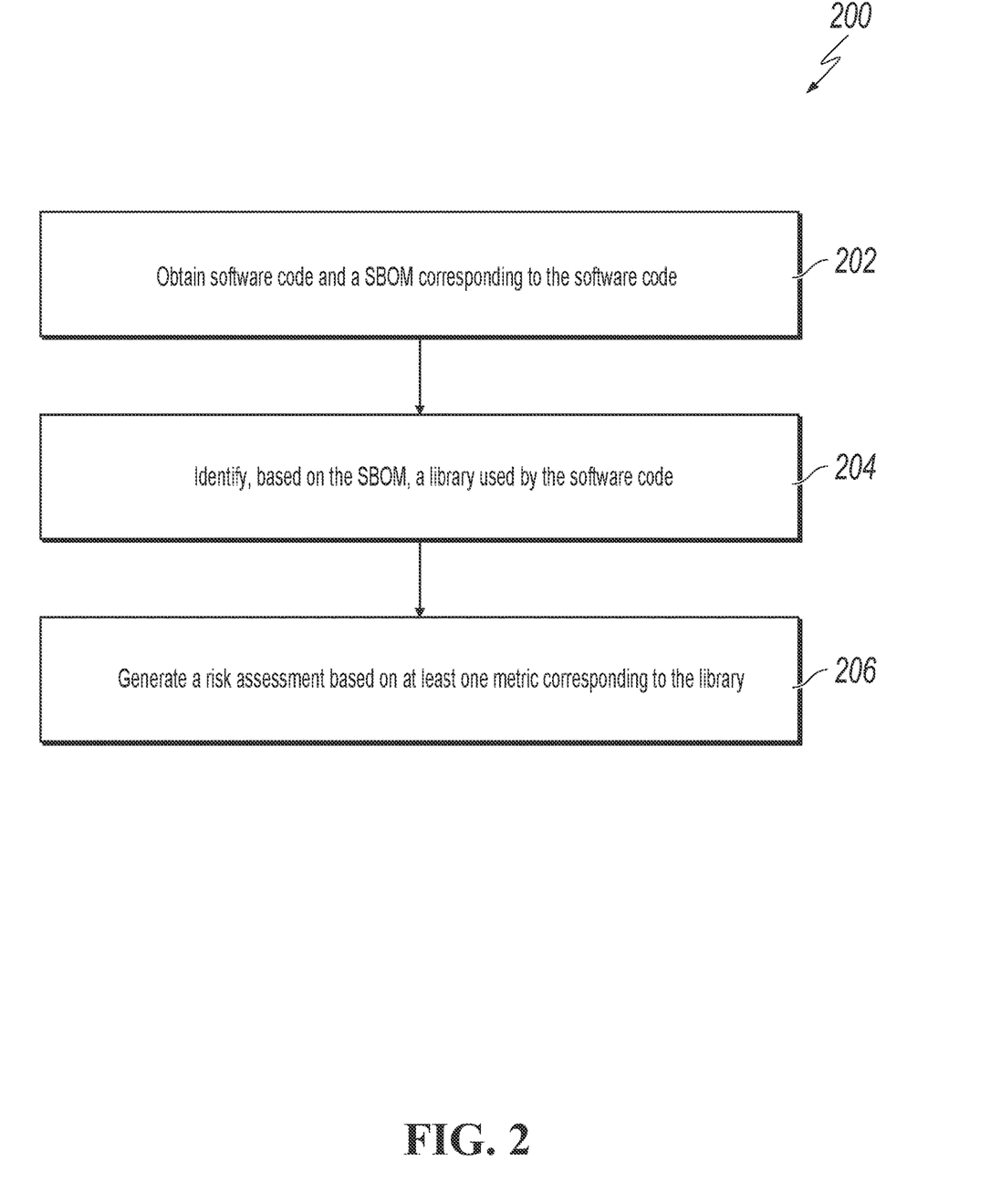
FIG. 2 is a flowchart showing an example method for identifying security risks in software code based on SBOM, according to an implementation.
Figure 3:
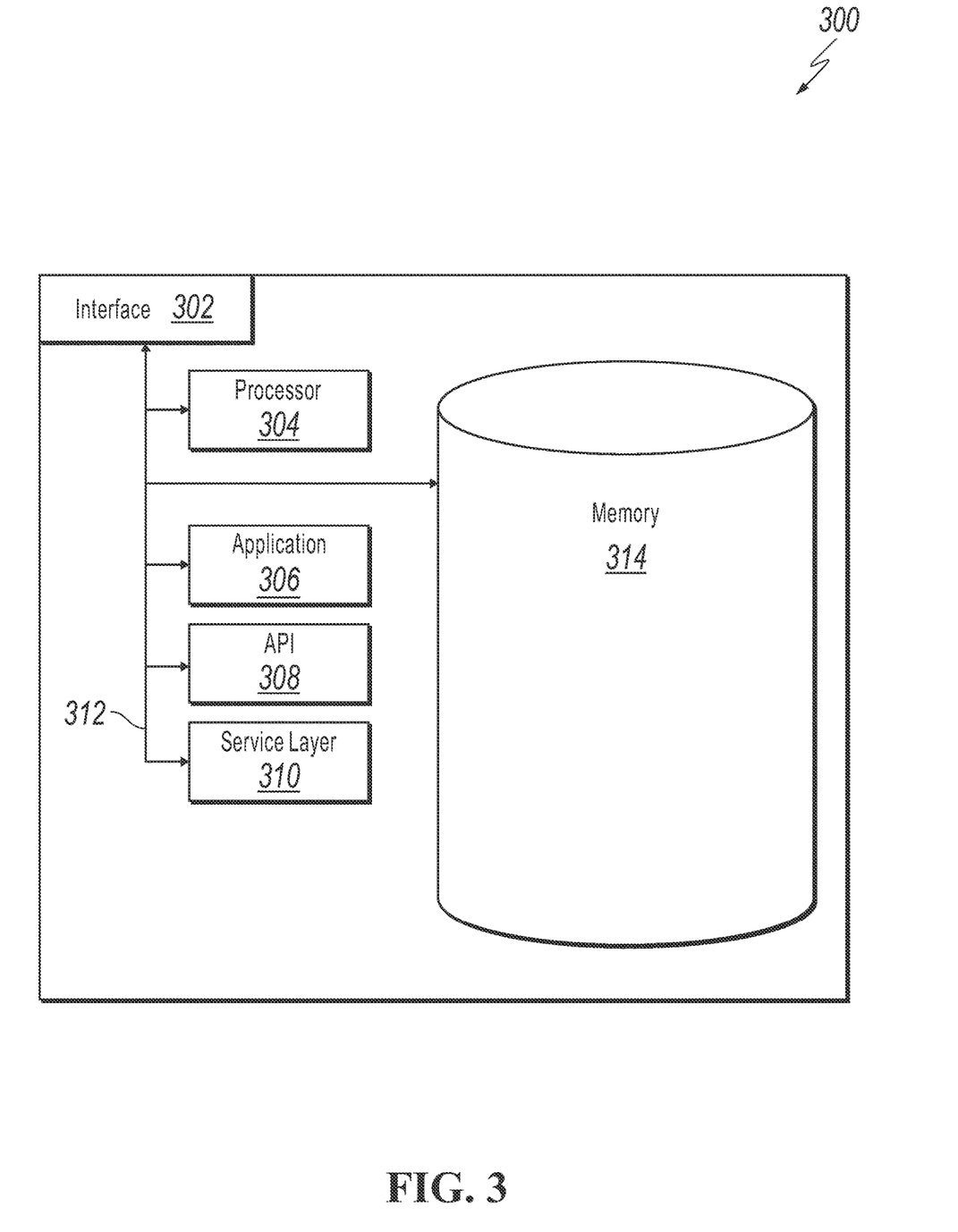
FIG. 3 is a high-level architecture block diagram of a computer according to an implementation.

In some implementations, a server can collect additional information about a software component beyond that in the SBOM, use one or more metrics to analyze the additional information, and generate a vulnerability level of the software component. For example, in the case of an open software library, the server can automatically collect metadata about the library from a code repository such as GitHub. The server can then use one or more metrics to analyze the collected metadata and generate a vulnerability level of the software component. Based on the vulnerability levels of the software components used by software code, the server can determine a risk assessment of the software code. FIGS. 1-3 and associated descriptions provide additional details of these implementations.

Techniques described herein produce one or more technical effects. In some cases, the techniques can enhance security of the software code by identifying security risks resulting from software supply chain attacks. In software supply chain attacks, the producer of the software code may not have been hacked and may appear non-vulnerable, but the tools or libraries used by the producer to produce the software code may have been compromised. The techniques can leverage comprehensive information both in and out of the SBOM to analyze the vulnerability levels of software components used by the software code. In this way, the techniques can detect software supply chain attacks occurred to one or more software components used by the software code, and thus can enhance security of the software code. Further, the techniques can look for information beyond the simple vulnerability levels documented in the SBOM and collect the metadata about the software components from external sources. The comprehensive information enables the server to produce a more accurate result of the vulnerability level of a software component. As well as detecting deliberate software supply chain attacks, the techniques also lend themselves to detecting cases where a software component has not been deliberately compromised but is still vulnerable. For example, the techniques can detect that a software component is not being well maintained (e.g., it takes a long time to make fixes for significant reported issues) and is likely to be vulnerable. In some cases, the techniques can improve efficiencies of detecting software supply chain attacks. For example, the techniques can maintain a database to store the vulnerability levels of software components that have been analyzed before. When a server needs the vulnerability level of a particular software component that has been analyzed before, the server does not need to analyze the software component from scratch. Instead, the server can retrieve the vulnerability level of the software component from the database and use the retrieved vulnerability level to assess the risk of another software code.

FIG. 1 is a schematic diagram showing an example communication system 100 that provides data communications for identifying security risks in software code based on SBOM, according to an implementation. At a high level, the example communication system 100 includes a software developer device 102 that is communicatively coupled with a software service platform 106 and a client device 108 over a network 110. In some cases, the software developer device 102 can be part of a software developer environment that includes multiple devices, servers, and cloud computing platforms.

The software developer device 102 represents an application, a set of applications, software, software modules, hardware, or any combination thereof, that can be configured to submit the software code to the software service platform 106. In some cases, the software developer device 102 and the software service platform 106 can be the same device. For example, the creation of the software code and the SBOM analyzer 104 can be implemented on the same device. The software code can be downloaded to the client device 108 to be executed on the client device 108. The software code can also be executed on the software service platform 106 to provide software service to the client device 108. Examples of the software services can include software as a service (SaaS) applications such as SALESFORCE, OFFICE 365, or other software application services.

The software service platform 106 includes a SBOM analyzer 104. The SBOM analyzer 104 represents an application, a set of applications, software, software modules, hardware, or any combination thereof, that is executed on the software service platform 106 to identify security risks in software code based on SBOM of the software code. In some implementations, the SBOM analyzer 104 can obtain software code and a SBOM corresponding to the software code, identify, based on the SBOM, a library used by the software code, and generate a risk assessment based on at least one metric corresponding to the library. FIGS. 2-3 and associated descriptions provide additional details of these implementations.

The software service platform 106 can be implemented using one or more computers, computer servers, or a cloud-computing platform.

The client device 108 represents an electronic device that accesses a software service provided by the software provider. In some cases, a browser or a client application can be executed on the client device 108 to communicate service requests and service responses with the software service platform of the software provider to obtain software services.

Turning to a general description, the client device 108 may include, without limitation, any of the following: endpoint, computing device, mobile device, mobile electronic device, user device, mobile station, subscriber station, portable electronic device, mobile communications device, wireless modem, wireless terminal, or other electronic device. Examples of an endpoint may include a mobile device, IoT (Internet of Things) device, EoT (Enterprise of Things) device, cellular phone, personal data assistant (PDA), smart phone, laptop, tablet, personal computer (PC), pager, portable computer, portable gaming device, wearable electronic device, health/medical/fitness device, camera, vehicle, or other mobile communications devices having components for communicating voice or data via a wireless communication network. A vehicle can include a motor vehicle (e.g., automobile, car, truck, bus, motorcycle, etc.), aircraft (e.g., airplane, unmanned aerial vehicle, unmanned aircraft system, drone, helicopter, etc.), spacecraft (e.g., spaceplane, space shuttle, space capsule, space station, satellite, etc.), watercraft (e.g., ship, boat, hovercraft, submarine, etc.), railed vehicle (e.g., train, tram, etc.), and other types of vehicles including any combinations of any of the foregoing, whether currently existing or after arising. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used interchangeably herein.

The example communication system 100 includes the network 110. The network 110 represents an application, set of applications, software, software modules, hardware, or combination thereof, that can be configured to transmit data messages between the entities in the example communication system 100. The network 110 can include a wireless network, a wireline network, the Internet, or a combination thereof. For example, the network 110 can include one or a plurality of radio access networks (RANs), core networks (CNs), and the Internet. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), LTE-Advanced, the fifth generation (5G), or any other radio access technologies. In some instances, the core networks may be evolved packet cores (EPCs).

A RAN is part of a wireless telecommunication system which implements a radio access technology, such as UMTS, CDMA2000, 3GPP LTE, 3GPP LTE-A, and 5G. In many applications, a RAN includes at least one base station. A base station may be a radio base station that may control all or at least some radio-related functions in a fixed part of the system. The base station may provide radio interface within their coverage area or a cell for a mobile device to communicate. The base station may be distributed throughout the cellular network to provide a wide area of coverage. The base station directly communicates to one or a plurality of mobile devices, other base stations, and one or more core network nodes.

While elements of FIG. 1 are shown as including various component parts, portions, or modules that implement the various features and functionality, nevertheless, these elements may instead include a number of sub-modules, third-party services, components, libraries, and such, as appropriate. Furthermore, the features and functionality of various components can be combined into fewer components, as appropriate.

FIG. 2 is a flowchart showing an example method 200 for identifying security risks in software code based on SBOM, according to an implementation. The example method 200 can be implemented by a server, e.g., the software service platform 106 shown in FIG. 1. The example method 200 shown in FIG. 2 can be implemented using additional, fewer, or different operations, which can be performed in the order shown or in a different order.

The method 200 starts at step 202 with obtaining software code and a SBOM corresponding to the software code. In some cases, the server can obtain the software code from at least one of a software developer device (e.g., the software developer device 102) or a software provider. Likewise, the server can obtain the SBOM from at least one of a software developer device (e.g., the software developer device 102) or a software provider. The server can obtain the software code and the SBOM together or separately. The software code can include at least one of source code or binary software code.

In a software development process, source code can be created by programmers using a text editor or visual programming tool prior to compilation. The source code can be developed with a human-readable programming language, and may be saved in a text file. The source code can be transformed by an assembler or a compiler into binary software code that can be executed by the computer.

The binary software code can include a stream of bytes that are generated by compiling the source code. Thus, the binary software code may not be in a human-readable format and may not be easily parsed or analyzed by a human.

The binary software code can be in a configuration of object code, executable code, or bytecode. An object code is the product of compiler output of a sequence of statements or instructions in a computer language. The source code can be logically divided into multiple source files. Each source file is compiled independently into a corresponding object file that includes object code. The object codes in the object files are binary machine codes, but they may not be ready to be executed. The object files can include incomplete references to subroutines outside itself and placeholder addresses. During the linking process, these object files can be linked together to form one executable file that includes executable code that can be executed on a computing device. During the linking process, the linker can read the object files, resolve references between them, perform the final code layout in the memory that determines the addresses for the blocks of code and data, fix up the placeholder addresses with real addresses, and write out the executable file that contains the executable code.

A bytecode, also referred to as portable code or p-code, is a form of instruction set designed for efficient execution by a software interpreter. Bytecodes include compact numeric codes, constants, and references (normally numeric addresses) that encode the result of compiler parsing and performing semantic analysis of things like type, scope, and nesting depths of program objects. The bytecode includes instruction sets that have one-byte opcodes followed by optional parameters. Intermediate representations such as the bytecode may be output by programming language implementations to ease interpretation, or it may be used to reduce hardware and operating system dependence by allowing the same code to run cross-platform, on different devices. The bytecode may often be either directly executed on a virtual machine (a p-code machine i.e., interpreter), or it may be further compiled into machine code for better performance. In some cases, binary software code that is coded using platform-independent languages such as JAVA can be stored in the bytecode format.

A SBOM is a nested inventory of its corresponding software code. The SBOM can include a list of the open source and/or closed source components present in the software code. The SBOM can be associated with a particular software component or set of components, an individual file, or even a snippet of code. The SBOM can be in multiple file formats, including, but not limited to, PDF, .xlsx, .spdx, .xml, .json, and .yaml.

In some cases, the SBOM can include one or more of library information, document creation information, package information, file information, snippet information, licensing information, relationship information, and annotations. The library information can include a list of open software libraries and/or closed software libraries used by the software code. For each library, the library information can also include a corresponding vulnerability level indicating whether the library is vulnerable. The document creation information can provide the necessary information for forward and backward compatibility for processing tools, such as version numbers, license for data, authors, etc. The package information can be used to describe a product, container, component, packaged upstream project sources, contents of a tarball, etc. The file information can include a file's important metadata, including its name, checksum licenses, copyright, etc. The snippet information can be used when a file is known to have some content that has been included from another original source. The snippet information can be useful for denoting when part of a file may have been originally created under another license. Licensing information can include a list of licenses that may be present in the software code. Relationships information can describe the ways that SBOM, packages, and files are related to each other. Annotations can include additional information that a reviewer of the SBOM wants to include in the SBOM.

At step 204, the method 200 identifies, based on the SBOM, a library used by the software code. In some examples, the server can identify at least one library used by the software code from the library information of the SBOM. In some implementations, the server can scan source code and/or binary code of the software code to identity at least one library used by the software code. In some examples, the server can analyze package manager configuration file(s) of the software code to identity at least one library used by the software code. In some cases, the server can identify one or more additional libraries that the software code is transitively dependent on. For example, the software can call a library A which uses a library B for a part of library A's functionality. In such case, the software is transitively dependent on library B. In some cases, the SBOM includes all transitively dependent libraries, even though they are not directly called in the software code. In these cases, the server can identify library B directly from the SBOM. Alternatively, the SBOM only includes libraries directly called by the software code, but does not include the transitively dependent libraries. In these cases, the server can check external source(s), such as code repositories GitHub, NuGet, npm, and Docker Hub, and identify one or more libraries that the software is transitively dependent on.

At step 206, the method 200 generates a risk assessment based on at least one metric corresponding to the library. The library can be an open software library or a closed software library. A typical open software library is freely licensed to use, copy, study, and change in any way, and the software code of the open software library is openly shared so that people are encouraged to voluntarily improve the design of the library. Examples of open software libraries include OpenSSL, OpenSSH, PuTTY, AES, OpenCog, OpenCV, FreeCAD, etc. On the contrary, a closed software library is typically under restrictive copyright licensing and the source code is usually hidden from the users. Examples of closed software libraries include Unity, NMath, Telerik Kendo UI, Oracle's version of Java, some versions of Unix, etc.

(1) Open Software Library

When the identified library is an open software library, the metrics corresponding to the library can be associated with at least one of maintainer(s) of the library, external interface(s) of the library, one or more functionality of the library, documentation of the library, ownership of the library, change of ownership of the library, an update frequency of the library, an open source software (OSS) supply chain size, changes in commit behaviors of a code committer, response time of one or more reported issues, an issue backlog size, or consistency of the code changes between releases.

In some cases, the at least one metric can include a frequency of adding or removing maintainers of the library. A maintainer can be a person who builds source code into a binary package for distribution, commits patches, or organizes code in a source repository. A maintainer may or may not be the owner of the library. In some examples, the library is potentially vulnerable if the frequency of adding or removing maintainers is unusually high. In some cases, the at least one metric can be a quantity of core maintainers. For example, if the quantity of core maintainers exceeds a predetermined threshold, the library is potentially vulnerable. The large quantity of core maintainers indicates that a large group of people can access and update this library, thereby increasing the chance of a watering hole attack. The watering hole attack refers to a type of computer attack in which an attacker guesses or observes which libraries are frequently used and infects one or more of them with malware.

In some cases, the server can analyze the context, such as functionalities and external interfaces, of the library to determine whether the library is vulnerable. The server may obtain the context information from the SBOM, from external sources, or by analyzing the software code. In some implementations, the external interfaces of the library may be enumerated and each external interface is analyzed to determine whether the external interface indicates a security risk. In some cases, the functionalities of the library, such as file processing, networking, etc., may be enumerated and each functionality is analyzed to determine whether the functionality indicates a security risk. For example, if a particular functionality complies with IEC 16508, which is an international functional safety standard that provides a framework for safety lifecycle activities, the particular functionality can be determined as less likely to be vulnerable.

In some cases, the at least one metric can include a quantity of documentation of the library. If the quantity of documentation of the library is lower than a predetermined threshold, the library can be determined as potentially vulnerable.

In some examples, the at least one metric can include a change frequency of ownership. For example, the library is potentially vulnerable if the frequency of changing ownership is unusually high. For another example, if the ownership has changed completely in a predetermined period of time, the library is potentially vulnerable. The server can obtain the ownership information from the SBOM or from external sources (e.g., GitHub owner and profile information).

In some implementations, the at least one metric can include an update frequency of the library. For example, if the library is updated at regular intervals in a predetermined period of time, the library can be determined as less likely to be vulnerable because the regular updates can demonstrate a presence of sustained engineering efforts.

In some cases, the at least one metric can include the OSS supply chain size. The OSS supply chain size can be, e.g., an access frequency of the open software library. The popularity of a library (e.g., how frequently it is downloaded, or how frequently it is depended on by other projects/software) can be a metric that can be used to determine the likelihood of vulnerabilities. If a library is unpopular, it can be more likely to contain vulnerabilities that go undetected. Therefore, in some case, if the popularity of the open software library is below a predetermined threshold, the library can be potentially vulnerable. On the other hand, if a library is popular, it can become a more likely target for attackers, and thus can also be more likely to contain vulnerabilities. Accordingly, in some cases, if the popularity of the open software library exceeds a predetermined threshold, the library can also be potentially vulnerable.

In some cases, the at least one metric can be associated with changes in commit behaviors of code committers that could be indicative of account takeovers. For example, the at least one metric can include a change frequency of a code committer's geographic locations. If the change frequency of the code committer's geographic locations exceeds a predetermined threshold, the library can be determined as potentially vulnerable. For another example, the at least one metric can include committing time of day, volumes of code changes for a committer, change of language or spelling use of a committer, code quality of a committer, projects a committer is committing to, etc. In some cases, the server can perform a code quality analysis for each committer. The code quality of a committer can be determined by retrieving all commits of the committer and performing an analysis. The code quality analysis for each committer enables the server to determine if user X is more trustworthy than user Y based on their commits. The projects involved by a committer enables the server to understand more about the committer's project exposure.

In some cases, the at least one metric can include response time of one or more reported issues. For example, the response time can be the time taken to make fixes for significant reported issues. If the response time exceeds a predetermined threshold, the library can be potentially vulnerable.

In some implementations, the at least one metric can include an issue backlog size. If the issue backlog size exceeds a predetermined threshold, the library can be potentially vulnerable.

In some examples, the at least one metric can include consistency of the code changes between releases. If the code changes between releases are unusually inconsistent, the library can be potentially vulnerable.

(2) Closed Software Library

The metric corresponding to a closed software library can include any one or more of the metrics corresponding to the open software library as described above. In addition, the metrics corresponding to a closed software library provided by an entity can be associated with at least one of financial status of the entity, ownership of the entity, adverse security-related news of the entity, one or more breaches associated with the entity, one or more accounting documents filed by the entity, one or more security certificates associated with the library, or one or more security certificates associated with the entity.

In some cases, the at least one metric corresponding to a closed software library provided by an entity can be associated with financial status of the entity. For example, if the financial status of the entity is healthy, the library can be determined as less likely to be vulnerable.

In some cases, the at least one metric corresponding to a closed software library provided by an entity can be associated with ownership of the entity. For example, the library can be potentially vulnerable if the frequency of changing ownership is unusually high. For another example, if the ownership has changed completely in a predetermined period of time, the library can be potentially vulnerable.

In some examples, the at least one metric corresponding to a closed software library provided by an entity can be associated with adverse security-related news of the entity. For example, the library can be potentially vulnerable if the entity was accused of providing insecure code in an adverse security-related news.

In some examples, the at least one metric corresponding to a closed software library provided by an entity can be associated with one or more breaches associated with the entity. For example, the library can be potentially vulnerable if the entity had a past security breach.

In some examples, the at least one metric corresponding to a closed software library provided by an entity can be associated with one or more accounting documents filed by the entity. For example, the library can be potentially vulnerable if the entity had not filed one or more accounts on time. In the United Kingdom, the account information can be obtained by performing automatic Her Majesty's Revenue and Customs (HMRC) checks.

In some cases, the at least one metric corresponding to a closed software library provided by an entity can be associated with one or more security certificates associated with the library. For example, the library can be determined as less likely to be vulnerable if the library is endorsed by one or more security certificates, such as ISO 27001.

In some implementations, the at least one metric corresponding to a closed software library provided by an entity can be associated with one or more security certificates associated with the entity. For example, the library can be determined as less likely to be vulnerable if the entity is endorsed by one or more security certificates, such as ISO 27001.

After collecting information associated with one or more of the metrics described above, the server can use the collected information to generate a vulnerability level of a library. In some cases, the server can determine that the library is not vulnerable if none of the one or more metrics indicates that the library is potentially vulnerable. In some examples, the server can determine that the library is potentially vulnerable if any one of the one or more metrics indicates that the library is potentially vulnerable.

In some implementations, the server can calculate a consolidated score based on the one or more metrics and determine a vulnerability level of the library based on the consolidated score. For example, the server can set a respective weight to each metric of the one or more metrics, calculate a respective score for each metric using the collected information of the metric, and calculate a weighted sum using the respective weight and respective score corresponding to each metric. If the consolidated score exceeds a predetermined threshold, the server can determine that the library is potentially vulnerable.

In some cases, a machine learning model can be trained using a plurality of sample vulnerability levels of libraries and one or more of the metrics described above. The server can then use the machine learning model and the collected information of the one or more metrics corresponding to a library to calculate a vulnerability level of the library.

In some cases, the server can use one or more of the metrics described above to analyze a library that the software code is transitively dependent on. In some cases, the software code can include a library A which calls another library B for a part of library A's functionality. If the server determines that the transitively dependent library B is potentially vulnerable, the server can determine that the library A is also potentially vulnerable, regardless of the vulnerability level of the library A indicated by the metrics described above.

In some implementations, the server can maintain a database to store the vulnerabilities of libraries after performing analyses of the libraries using the metrics described above. For example, after the server has determined a vulnerability level of a library, the server can record the vulnerability level of the library in the database. When the server obtains an additional SBOM and needs to analyze a library in the additional SBOM, the server can first search the database for vulnerability level of the library. If the vulnerability level of the library is stored in the database, the server can retrieve the vulnerability level of the library from the database and use the retrieved vulnerability level to generate a risk assessment of the software code. In this way, the server does not need to perform another real-time analysis of the library using one or more of the metrics described above. If the vulnerability level of the library is not stored in the database, the server can analyze the library using one or more of the metrics described above.

In some cases, when the server records the vulnerability level of the library in the database, the server can also record a timestamp indicating the time that the library was analyzed. The library's vulnerability level may change over time, so the vulnerability level of the library recorded in the database may become invalid if the record is outdated. In some implementations, when the server needs the vulnerability level of a library and has found the vulnerability level of the library in the database, the server can retrieve the timestamp associated with the vulnerability level of the library. If the server determines that a time difference between the timestamp and the current time exceeds a predetermined time threshold, the server can ignore the vulnerability level of the library stored in the database and re-analyze the library using one or more of the metrics described above. In some cases, the server can delete the vulnerability level of the library from the database when the server determines that a time difference between the timestamp and the current time exceeds a predetermined time threshold.

In some cases, when the server records the vulnerability level of the library in the database, the server can also record a version number of the library that has been analyzed. In some implementations, when the server needs the vulnerability level of a library and has found the vulnerability level of the library in the database, the server can retrieve the version number of the library. If the server determines that the retrieved version number is different from the version number of the library to be analyzed, the server can ignore the vulnerability level of the library stored in the database and re-analyze the library using one or more of the metrics described above. In some cases, the server can delete the vulnerability level of the library from the database when the server determines that the retrieved version number is different from the version number of the library to be analyzed.

In some cases, the server can output the risk assessment. The risk assessment can include, e.g., one or more libraries that are indicated as potentially vulnerable based on one or more metrics described above and/or one or more libraries that are indicated as less likely to be vulnerable based on one or more metrics described above. In some examples, the server can send the risk assessment to another device (e.g., the software developer device that submits the software code), or output the risk assessment in a user interface (UI) of the server. The risk assessment can then be further reviewed manually or by other computer-implemented review methods to confirm the vulnerability levels of the libraries listed in the risk assessment. In one embodiment, the risk assessment can be compared to rules defined in a security policy to prevent the execution of the software on some client devices.

FIG. 3 illustrates a high level architecture block diagram of a computer 300 according to an implementation. The computer 300 can be implemented as one of the software developer device 102, the software service platform 106, and the client device 108 of FIG. 1. The described illustration is only one possible implementation of the described subject matter and is not intended to limit the disclosure to the single described implementation. Those of ordinary skill in the art will appreciate the fact that the described components can be connected, combined, and/or used in alternative ways consistent with this disclosure.

The computer 300 includes a computing system configured to identify security risks in software code based on SBOM. In some cases, the computer 300 may include a computing system implementing processes and methods disclosed in FIG. 2. In some cases, the processing algorithm of the code package establishment can be implemented in an executable computing code, e.g., C/C++ executable codes. In some cases, the computer 300 can include a standalone Linux system that runs batch applications. In some cases, the computer 300 can include mobile or personal computers.

The computer 300 may comprise a computer that includes an input device, such as a keypad, keyboard, touch screen, microphone, speech recognition device, other device that can accept user information, and/or an output device that conveys information associated with the operation of the computer, including digital data, visual and/or audio information, or a GUI.

The computer 300 can serve as a client, network component, a server, a database or other persistency, and/or any other components. In some implementations, one or more components of the computer 300 may be configured to operate within a cloud-computing-based environment.

At a high level, the computer 300 is an electronic computing device operable to receive, transmit, process, store, or manage data. According to some implementations, the computer 300 can also include or be communicably coupled with an application server, e-mail server, web server, caching server, streaming data server, business intelligence (BI) server, and/or other server.

The computer 300 can collect data of network events or mobile application usage events over network 110 from a web browser or a client application, e.g., an installed plugin. In addition, data can be collected by the computer 300 from internal users (e.g., from a command console or by another appropriate access method), external or third parties, other automated applications, as well as any other appropriate entities, individuals, systems, or computers.

Each of the components of the computer 300 can communicate using a system bus 312. In some implementations, any and/or all the components of the computer 300, both hardware and/or software, may interface with each other and/or the interface 302 over the system bus 312 using an API 308 and/or a service layer 310. The API 308 may include specifications for routines, data structures, and object classes. The API 308 may be either computer language-independent or -dependent and refer to a complete interface, a single function, or even a set of APIs. The service layer 310 provides software services to the computer 300. The functionality of the computer 300 may be accessible for all service consumers using this service layer. Software services, such as those provided by the service layer 310, provide reusable, defined business functionalities through a defined interface. For example, the interface may be software written in JAVA, C++, or other suitable languages providing data in Extensible Markup Language (XML) format or other suitable format. While illustrated as an integrated component of the computer 300, alternative implementations may illustrate the API 308 and/or the service layer 310 as stand-alone components in relation to other components of the computer 300. Moreover, any or all parts of the API 308 and/or the service layer 310 may be implemented as child or sub-modules of another software module, enterprise application, or hardware module without departing from the scope of this disclosure.

The computer 300 includes an interface 302. Although illustrated as a single interface 302 in FIG. 3, two or more interfaces 302 may be used according to particular needs, desires, or particular implementations of the computer 300. The interface 302 is used by the computer 300 for communicating with other systems in a distributed environment connected to a network (whether illustrated or not). Generally, the interface 302 comprises logic encoded in software and/or hardware in a suitable combination and operable to communicate with the network. More specifically, the interface 302 may comprise software supporting one or more communication protocols associated with communications such that the network or interface's hardware is operable to communicate physical signals within and outside of the computer 300.

The computer 300 includes at least one processor 304. Although illustrated as a single processor 304 in FIG. 3, two or more processors may be used according to particular needs, desires, or particular implementations of the computer. Generally, the processor 304 executes instructions and manipulates data to perform the operations of the computer 300. Specifically, the processor 304 executes the functionality required for identifying security risks in software code disclosed in FIG. 2.

The computer 300 also includes a memory 314 that holds data for the computer 300. Although illustrated as a single memory 314 in FIG. 3, two or more memories may be used according to particular needs, desires, or particular implementations of the computer 300. While memory 314 is illustrated as an integral component of the computer 300, in alternative implementations, memory 314 can be external to the computer 300.

The application 306 is an algorithmic software engine providing functionality according to particular needs, desires, or particular implementations of the computer 300, particularly with respect to functionality required for anomaly detection. Although illustrated as a single application 306, the application 306 may be implemented as multiple applications 306 on the computer 300. In addition, although illustrated as integral to the computer 300, in alternative implementations, the application 306 can be external to the computer 300.

There may be any number of computers 300 associated with, or external to, and communicating over a network. Further, this disclosure contemplates that many users may use one computer 300, or that one user may use multiple computers 300.

Described implementations of the subject matter can include one or more features, alone or in combination.

For example, in a first implementation, a method, comprising: obtaining, by a server, software code and a Software Bill of Materials (SBOM) corresponding to the software code; identifying, by the server and based on the SBOM, a library used by the software code; and generating, by the server, a risk assessment based on at least one metric corresponding to the library, wherein the at least one metric is associated with one or more maintainers of the library.

The foregoing and other described implementations can each, optionally, include one or more of the following features:

A first feature, combinable with any of the following features, wherein the library is an open software library, and wherein the at least one metric is further associated with at least one of: one or more external interfaces of the library; one or more functionality of the library; documentation of the library; ownership of the library; change of ownership of the library; an update frequency of the library; an open source software (OSS) supply chain size; response time of one or more reported issues; or an issue backlog size.

A second feature, combinable with any of the following features, wherein the library is a closed software library provided by an entity, and wherein the at least one metric is further associated with at least one of: financial status of the entity; ownership of the entity; one or more breaches associated with the entity; one or more accounting documents filed by the entity; one or more security certificates associated with the library; or one or more security certificates associated with the entity.

A third feature, combinable with any of the following features, wherein generating the risk assessment comprises: identifying, by the server, one or more additional libraries that the software code is transitively dependent on; and generating, by the server, the risk assessment based on the one or more additional libraries.

A fourth feature, combinable with any of the following features, comprising: determining, by the server and based on the at least one metric, a vulnerability level of the library; and storing, by the server, the vulnerability level of the library in a database.

A fifth feature, combinable with any of the following features, comprising: obtaining, by the server, an additional SBOM; determining, by the server, that the additional SBOM includes the library; obtaining, by the server, the vulnerability level of the library from the database; and generating, by the server, an additional risk assessment associated with the additional SBOM based on the vulnerability level of the library stored in the database.

A sixth feature, combinable with any of the following features, comprising: storing, by the server, a timestamp associated with the vulnerability level of the library, wherein the timestamp indicates a time that the vulnerability level of the library is determined.

In a second implementation, a computer-readable medium containing instructions which, when executed, cause a computing device to perform operations comprising: obtaining, by a server, software code and a Software Bill of Materials (SBOM) corresponding to the software code; identifying, by the server and based on the SBOM, a library used by the software code; and generating, by the server, a risk assessment based on at least one metric corresponding to the library, wherein the at least one metric is associated with one or more maintainers of the library.

The foregoing and other described implementations can each, optionally, include one or more of the following features:

A first feature, combinable with any of the following features, wherein the library is an open software library, and wherein the at least one metric is further associated with at least one of: one or more external interfaces of the library; one or more functionality of the library; documentation of the library; ownership of the library; change of ownership of the library; an update frequency of the library; an open source software (OSS) supply chain size; response time of one or more reported issues; or an issue backlog size.

A second feature, combinable with any of the following features, wherein the library is a closed software library provided by an entity, and wherein the at least one metric is further associated with at least one of: financial status of the entity; ownership of the entity; one or more breaches associated with the entity; one or more accounting documents filed by the entity; one or more security certificates associated with the library; or one or more security certificates associated with the entity.

A third feature, combinable with any of the following features, wherein generating the risk assessment comprises: identifying, by the server, one or more additional libraries that the software code is transitively dependent on; and generating, by the server, the risk assessment based on the one or more additional libraries.

A fourth feature, combinable with any of the following features, the operations comprising: determining, by the server and based on the at least one metric, a vulnerability level of the library; and storing, by the server, the vulnerability level of the library in a database.

A fifth feature, combinable with any of the following features, the operations comprising: obtaining, by the server, an additional SBOM; determining, by the server, that the additional SBOM includes the library; obtaining, by the server, the vulnerability level of the library from the database; and generating, by the server, an additional risk assessment associated with the additional SBOM based on the vulnerability level of the library stored in the database.

A sixth feature, combinable with any of the following features, the operations comprising: storing, by the server, a timestamp associated with the vulnerability level of the library, wherein the timestamp indicates a time that the vulnerability level of the library is determined.

In a third implementation, a computer-implemented system, comprising: one or more computers; and one or more computer memory devices interoperably coupled with the one or more computers and having tangible, non-transitory, machine-readable media storing one or more instructions that, when executed by the one or more computers, perform one or more operations comprising: obtaining, by a server, software code and a Software Bill of Materials (SBOM) corresponding to the software code; identifying, by the server and based on the SBOM, a library used by the software code; and generating, by the server, a risk assessment based on at least one metric corresponding to the library, wherein the at least one metric is associated with one or more maintainers of the library.

A first feature, combinable with any of the following features, wherein the library is an open software library, and wherein the at least one metric is further associated with at least one of: one or more external interfaces of the library; one or more functionality of the library; documentation of the library; ownership of the library; change of ownership of the library; an update frequency of the library; an open source software (OSS) supply chain size; response time of one or more reported issues; or an issue backlog size.

A second feature, combinable with any of the following features, wherein the library is a closed software library provided by an entity, and wherein the at least one metric is further associated with at least one of: financial status of the entity; ownership of the entity; one or more breaches associated with the entity; one or more accounting documents filed by the entity; one or more security certificates associated with the library; or one or more security certificates associated with the entity.

A third feature, combinable with any of the following features, wherein generating the risk assessment comprises: identifying, by the server, one or more additional libraries that the software code is transitively dependent on; and generating, by the server, the risk assessment based on the one or more additional libraries.

A fourth feature, combinable with any of the following features, the operations comprising: determining, by the server and based on the at least one metric, a vulnerability level of the library; and storing, by the server, the vulnerability level of the library in a database.

A fifth feature, combinable with any of the following features, the operations comprising: obtaining, by the server, an additional SBOM; determining, by the server, that the additional SBOM includes the library; obtaining, by the server, the vulnerability level of the library from the database; and generating, by the server, an additional risk assessment associated with the additional SBOM based on the vulnerability level of the library stored in the database.

A sixth feature, combinable with any of the following features, the operations comprising: storing, by the server, a timestamp associated with the vulnerability level of the library, wherein the timestamp indicates a time that the vulnerability level of the library is determined.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible, non-transitory computer-storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of one or more of them.

The terms "data processing apparatus," "computer," or "electronic computer device" (or equivalent as understood by one of ordinary skill in the art) refer to data processing hardware and encompass all kinds of apparatus, devices, and machines for processing data, including by way of example, a programmable processor, a computer, or multiple processors or computers. The apparatus can also be or further include special purpose logic circuitry, e.g., a central processing unit (CPU), an FPGA (field programmable gate array), or an ASIC (application specific integrated circuit). In some implementations, the data processing apparatus and/or special purpose logic circuitry may be hardware-based and/or software-based. The apparatus can optionally include code that creates an execution environment for computer programs, e.g., code that constitutes processor firmware, a protocol stack, a database management system, an operating system, or a combination of one or more of them. The present disclosure contemplates the use of data processing apparatus with or without conventional operating systems, for example LINUX, UNIX, WINDOWS, MAC OS, ANDROID, IOS or any other suitable conventional operating system.

A computer program, which may also be referred to or described as a program, software, a software application, a module, a software module, a script, or code, can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network. While portions of the programs illustrated in the various figures are shown as individual modules that implement the various features and functionality through various objects, methods, or other processes, the programs may instead include a number of sub-modules, third-party services, components, libraries, and such, as appropriate. Conversely, the features and functionality of various components can be combined into single components, as appropriate.

The processes and logic flows described in this specification can be performed by one or more programmable computers, executing one or more computer programs to perform functions by operating on input data and generating output. The processes and logic flows can also be performed by, and apparatus can also be implemented as, special purpose logic circuitry, e.g., a CPU, an FPGA, or an ASIC.

Computers suitable for the execution of a computer program can be based on general or special purpose microprocessors, both, or any other kind of CPU. Generally, a CPU will receive instructions and data from a ROM or a RAM or both. The essential elements of a computer are a CPU for performing or executing instructions and one or more memory devices for storing instructions and data. Generally, a computer will also include, or be operatively coupled to, receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a PDA, a mobile audio or video player, a game console, a GPS receiver, or a portable storage device, e.g., a USB flash drive, to name just a few.

Computer readable media (transitory or non-transitory, as appropriate) suitable for storing computer program instructions and data include all forms of non-volatile memory, media and memory devices, including by way of example semiconductor memory devices, e.g., erasable programmable read-only memory (EPROM), electrically erasable programmable read-only memory (EEPROM), and flash memory devices; magnetic disks, e.g., internal hard disks or removable disks; magneto optical disks; and CD ROM, DVD+/−R, DVD-RAM, and DVD-ROM disks. The memory may store various objects or data, including caches, classes, frameworks, applications, backup data, jobs, web pages, web page templates, database tables, repositories storing business and/or dynamic information, and any other appropriate information including any parameters, variables, algorithms, instructions, rules, constraints, or references thereto. Additionally, the memory may include any other appropriate data, such as logs, policies, security or access data, reporting files, as well as others. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube), LCD, LED, or plasma monitor, for displaying information to the user and a keyboard and a pointing device, e.g., a mouse, trackball, or trackpad by which the user can provide input to the computer. Input may also be provided to the computer using a touchscreen, such as a tablet computer surface with pressure sensitivity, a multi-touch screen using capacitive or electric sensing, or other type of touchscreen. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The term "graphical user interface," or "GUI," may be used in the singular or the plural to describe one or more graphical user interfaces and each of the displays of a particular graphical user interface. Therefore, a GUI may represent any graphical user interface, including but not limited to, a web browser, a touch screen, or a command line interface (CLI) that processes information and efficiently presents the information results to the user. In general, a GUI may include a plurality of user interface (UI) elements, some or all associated with a web browser, such as interactive fields, pull-down lists, and buttons operable by the business suite user. These and other UI elements may be related to or represent the functions of the web browser.

Implementations of the subject matter described in this specification can be implemented in a computing system that includes a back end component, e.g., such as a data server, or that includes a middleware component, e.g., an application server, or that includes a front-end component, e.g., a client computer having a graphical user interface or a Web browser through which a user can interact with an implementation of the subject matter described in this specification, or any combination of one or more such back end, middleware, or front end components. The components of the system can be interconnected by any form or medium of wireline and/or wireless digital data communication, e.g., a communication network. Examples of communication networks include a local area network (LAN), a radio access network (RAN), a metropolitan area network (MAN), a wide area network (WAN), Worldwide Interoperability for Microwave Access (WIMAX), a WLAN using, for example, 802.11 a/b/g/n and/or 802.20, all or a portion of the Internet, and/or any other communication system or systems at one or more locations. The network may communicate with, for example, Internet Protocol (IP) packets, Frame Relay frames, Asynchronous Transfer Mode (ATM) cells, voice, video, data, and/or other suitable information between network addresses.

The computing system can include clients and servers. A client and server are generally remote from each other and typically interact through a communication network. The relationship of client and server arises by virtue of computer programs running on the respective computers and having a client-server relationship with each other.

In some implementations, any or all of the components of the computing system, both hardware and/or software, may interface with each other and/or the interface using an API and/or a service layer. The API may include specifications for routines, data structures, and object classes. The API may be either computer language independent or dependent and refer to a complete interface, a single function, or even a set of APIs. The service layer provides software services to the computing system. The functionality of the various components of the computing system may be accessible for all service consumers via this service layer. Software services provide reusable, defined business functionalities through a defined interface. For example, the interface may be software written in JAVA, C++, or other suitable language providing data in XML format or other suitable formats. The API and/or service layer may be an integral and/or a stand-alone component in relation to other components of the computing system. Moreover, any or all parts of the service layer may be implemented as child or sub-modules of another software module, enterprise application, or hardware module without departing from the scope of this disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking and parallel processing may be advantageous.

Moreover, the separation and/or integration of various system modules and components in the implementations described above should not be understood as requiring such separation and/or integration in all implementations, and it should be understood that the described program components and systems can generally be integrated together in a single software product or packaged into multiple software products.

Accordingly, the above description of example implementations does not define or constrain this disclosure. Other changes, substitutions, and alterations are also possible without departing from the spirit and scope of this disclosure.

The invention claimed is:

1. A method, comprising:
    obtaining, by a server, software code and a Software Bill of Materials (SBOM) corresponding to the software code;
    identifying, by the server and based on the SBOM, a library used by the software code; and
    generating, by the server, a risk assessment based on at least one metric corresponding to the library, wherein the at least one metric is a number of one or more maintainers of the library, wherein the generating comprises:
        determining, by the server, a vulnerability level of the library based on determining whether the number of the one or more maintainers exceeds a predetermined quantity threshold; and
        storing, by the server, the vulnerability level of the library in a database.

2. The method of claim 1, wherein the library is an open software library, and wherein the at least one metric is further associated with at least one of:
    one or more external interfaces of the library;
    one or more functionality of the library;
    documentation of the library;
    ownership of the library;
    change of ownership of the library;
    an update frequency of the library;
    an open source software (OSS) supply chain size;
    response time of one or more reported issues; or
    an issue backlog size.

3. The method of claim 1, wherein the library is a closed software library provided by an entity, and wherein the at least one metric is further associated with at least one of:
   financial status of the entity;
   ownership of the entity;
   one or more breaches associated with the entity;
   one or more accounting documents filed by the entity;
   one or more security certificates associated with the library; or
   one or more security certificates associated with the entity.

4. The method of claim 1, wherein generating the risk assessment comprises:
   identifying, by the server, one or more additional libraries that the software code is transitively dependent on; and
   generating, by the server, the risk assessment based on the one or more additional libraries.

5. The method of claim 1, comprising:
   obtaining, by the server, an additional SBOM;
   determining, by the server, that the additional SBOM includes the library;
   obtaining, by the server, the vulnerability level of the library from the database; and
   generating, by the server, an additional risk assessment associated with the additional SBOM based on the vulnerability level of the library stored in the database.

6. The method of claim 1, comprising:
   storing, by the server, a timestamp associated with the vulnerability level of the library, wherein the timestamp indicates a time that the vulnerability level of the library is determined.

7. A computer-readable medium containing instructions which, when executed, cause a computing device to perform operations comprising:
   obtaining, by a server, software code and a Software Bill of Materials (SBOM) corresponding to the software code;
   identifying, by the server and based on the SBOM, a library used by the software code; and
   generating, by the server, a risk assessment based on at least one metric corresponding to the library, wherein the at least one metric is a number of one or more maintainers of the library, wherein the generating comprises:
      determining, by the server, a vulnerability level of the library based on determining whether the number of the one or more maintainers exceeds a predetermined quantity threshold; and
      storing, by the server, the vulnerability level of the library in a database.

8. The computer-readable medium of claim 7, wherein the library is an open software library, and wherein the at least one metric is further associated with at least one of:
   one or more external interfaces of the library;
   one or more functionality of the library;
   documentation of the library;
   ownership of the library;
   change of ownership of the library;
   an update frequency of the library;
   an open source software (OSS) supply chain size;
   response time of one or more reported issues; or
   an issue backlog size.

9. The computer-readable medium of claim 7, wherein the library is a closed software library provided by an entity, and wherein the at least one metric is further associated with at least one of:
   financial status of the entity;
   ownership of the entity;
   one or more breaches associated with the entity;
   one or more accounting documents filed by the entity;
   one or more security certificates associated with the library; or
   one or more security certificates associated with the entity.

10. The computer-readable medium of claim 7, wherein generating the risk assessment comprises:
   identifying, by the server, one or more additional libraries that the software code is transitively dependent on; and
   generating, by the server, the risk assessment based on the one or more additional libraries.

11. The computer-readable medium of claim 7, the operations comprising:
   obtaining, by the server, an additional SBOM;
   determining, by the server, that the additional SBOM includes the library;
   obtaining, by the server, the vulnerability level of the library from the database; and
   generating, by the server, an additional risk assessment associated with the additional SBOM based on the vulnerability level of the library stored in the database.

12. The computer-readable medium of claim 7, the operations comprising:
   storing, by the server, a timestamp associated with the vulnerability level of the library, wherein the timestamp indicates a time that the vulnerability level of the library is determined.

13. A computer-implemented system, comprising:
   one or more computers; and
   one or more computer memory devices interoperably coupled with the one or more computers and having tangible, non-transitory, machine-readable media storing one or more instructions that, when executed by the one or more computers, perform one or more operations comprising:
      obtaining, by a server, software code and a Software Bill of Materials (SBOM) corresponding to the software code;
      identifying, by the server and based on the SBOM, a library used by the software code; and
      generating, by the server, a risk assessment based on at least one metric corresponding to the library, wherein the at least one metric is a number of one or more maintainers of the library, wherein the generating comprises:
         determining, by the server, a vulnerability level of the library based on determining whether the number of the one or more maintainers exceeds a predetermined quantity threshold; and
         storing, by the server, the vulnerability level of the library in a database.

14. The computer-implemented system of claim 13, wherein the library is an open software library, and wherein the at least one metric is further associated with at least one of:
   one or more external interfaces of the library;
   one or more functionality of the library;
   documentation of the library;
   ownership of the library;
   change of ownership of the library;
   an update frequency of the library;
   an open source software (OSS) supply chain size;
   response time of one or more reported issues; or
   an issue backlog size.

15. The computer-implemented system of claim 13, wherein the library is a closed software library provided by an entity, and wherein the at least one metric is further associated with at least one of:
- financial status of the entity;
- ownership of the entity;
- one or more breaches associated with the entity;
- one or more accounting documents filed by the entity;
- one or more security certificates associated with the library; or
- one or more security certificates associated with the entity.

16. The computer-implemented system of claim 13, wherein generating the risk assessment comprises:
- identifying, by the server, one or more additional libraries that the software code is transitively dependent on; and
- generating, by the server, the risk assessment based on the one or more additional libraries.

17. The computer-implemented system of claim 13, the operations comprising:
- obtaining, by the server, an additional SBOM;
- determining, by the server, that the additional SBOM includes the library;
- obtaining, by the server, the vulnerability level of the library from the database; and
- generating, by the server, an additional risk assessment associated with the additional SBOM based on the vulnerability level of the library stored in the database.

18. The computer-implemented system of claim 13, the operations comprising:
- storing, by the server, a timestamp associated with the vulnerability level of the library, wherein the timestamp indicates a time that the vulnerability level of the library is determined.

\* \* \* \* \*